Patented Sept. 1, 1953

2,650,896

UNITED STATES PATENT OFFICE 2,650,896

CYANIDE ION IN PRODUCTION OF VITAMIN $B_{12}$

Lloyd E. McDaniel, Plainfield, and Harold B. Woodruff, Westfield, N. J., assignors to Merck & Co., Inc., Rahway, N. J., a corporation of New Jersey No Drawing. Application May 11, 1950, Serial No. 161,484

10 Claims. (Cl. 195—114)

This invention relates to the production of vitamin $B_{12}$ in fermentation processes, and more particularly to improvements in such fermentation processes which make possible markedly increased yields of vitamin $B_{12}$ and substances closely related thereto.

Vitamin $B_{12}$ is a product having LLD (Lactobacillus lactis Dorner) and APF (animal protein factor) activity which is particularly useful in the treatment of pernicious anemia, and in the promotion of growth in chickens and pigs, and was obtained from liver as disclosed in a publication by Rickes et al. in Science, 107, pages 296-7. It has been pointed out in a later publication by Rickes et al. in Science, 108, pages 634-5 that vitamin $B_{12}$ can be obtained from fermentation media produced by the propagation of a number of different microorganisms, and that the crystalline product that obtained is identical with the crystalline vitamin $B_{12}$ previously obtained from liver. Although the chemical structure of vitamin $B_{12}$ is not yet completely known, it has been determined that vitamin $B_{12}$ contains a characteristic —CN group in the molecule.

Procedures for obtaining vitamin $B_{12}$ from Streptomyces griseus fermentation liquors are fully disclosed and claimed in a pending application by our colleagues Rickes and Wood, Serial No. 20,356, filed April 10, 1948 (now abandoned); and in a continuation-in-part of said application, i. e., Serial No. 38,176, filed July 10, 1948, now U. S. Patent No. 2,595,499, dated May 6, 1952, procedures are disclosed and claimed for producing vitamin $B_{12}$ by fermentation with a number of different organisms of the sub-phylum fungi. In these various fermentation processes, it has been found that in addition to vitamin $B_{12}$, substances are formed which have similar LLD and APF activity but which differ from vitamin $B_{12}$ in containing no —CN group. These substances can be converted to vitamin $B_{12}$ by reaction with a substance furnishing a source of cyanide ion as more fully disclosed and claimed in an application by our colleague Frank J. Wolf, Serial No. 120,099, filed October 6, 1949, now U. S. Patent No. 2,530,416, dated November 21, 1950. The convertability of these substances to vitamin $B_{12}$ further demonstrates their very close relationship to vitamin $B_{12}$, and we will refer to these closely related substances hereinafter as vitamin $B_{12}$-like materials, or vitamin $B_{12}$-like substances. There is a rather strong indication, however, that the so-called vitamin $B_{12}$-like materials may consist predominantly of a derivative of vitamin $B_{12}$ characterized by the absence of the —CN group in the molecule. Such a derivative has been prepared by hydrogenation of vitamin $B_{12}$ in the presence of platinum oxide catalyst. In this connection, attention is directed to a publication by Kaczka et al., J. A. C. S. 71, 1514, reporting this catalytic reduction of vitamin $B_{12}$ and identifying the product as vitamin $B_{12a}$.

We have now discovered that a marked increase in yield of vitamin $B_{12}$ and of vitamin $B_{12}$-like materials (estimated as vitamin $B_{12a}$) can be obtained by conducting fermentation with various vitamin $B_{12}$-producing organisms in the presence of a small amount of a substance from which the organism may obtain the —CN group. As more fully hereinafter described, the fermentation can be conducted in the presence of a substance which furnishes to the organism a direct source of cyanide ion such as a simple cyanide which ionizes in solution, or in the presence of a complex from which the organism can liberate the cyanide group in utilizable form.

There have been various disclosures in the prior art showing the use of cyanides as inhibitors of enzyme systems in microorganisms, the effect of such inhibition of enzyme systems being to alter the nature and amounts of fermentation products obtained. In our improved process for producing vitamin $B_{12}$ and vitamin $B_{12}$-like materials by fermentation, however, experimental results are believed to indicate that the increased yields are due not to any inhibition of the organism or its associated enzyme system, but rather to a specific precursor action provided by the presence of cyanide ion available to the organism in the medium.

While we do not wish to be bound by a theoretical explanation of this phenomenon, the following observations are believed to be significant. The vitamin $B_{12}$-like materials which are produced along with vitamin $B_{12}$ during fermentation are very similar to vitamin $B_{12}$ but do not contain the cyanide group. Inasmuch as fermentating broths when producing vitamin $B_{12}$ are often mildly reducing, it would appear that the vitamin $B_{12}$-like materials are formed at least in part in the medium by this reducing action on the vitamin $B_{12}$ actually synthesized by the organism. While the cyanide ion could function, and possibly does function in part, to convert the vitamin $B_{12}$-like materials to vitamin $B_{12}$ (by substitution of the cyanide ion in the molecule as more fully disclosed and claimed in the above-mentioned application of our colleague Frank J. Wolf, Serial No. 120,009, filed October 6, 1949), the experimental evidence also clearly demonstrates that the increase in vitamin $B_{12}$ activity which we obtain is markedly greater than the increase which can be accounted for by such conversion of vitamin $B_{12}$-like materials to vitamin $B_{12}$. In other words, the total vitamin $B_{12}$ activity, i. e., vitamin $B_{12}$ plus vitamin $B_{12}$-like materials is markedly increased by our improved process, thus demonstrating that the cyanide ion has a definite precursor action stimulating synthesis of vitamin $B_{12}$ by the organism during fermentation.

The apparent action of cyanide ion as a precursor in our improved process is a factor which is both surprising and unexpected in view of prior knowledge concerning use of cyanide ion in fermentation processes. In this connection, there is a distinct difference between the prior art procedures of affecting an enzyme system by the presence of cyanide so as to cause an increase in yield of some fermentation product which contains no cyanide group, and our improved process wherein the cyanide ion supplied in the medium is actually utilized by the organism in the synthesis of vitamin $B_{12}$.

In carrying out improved fermentation procedures in accordance with the present invention, fermentation media otherwise capable of fostering production of vitamin $B_{12}$ and vitamin $B_{12}$-like materials are supplemented by addition of a substance which will furnish to the organism a source of cyanide ion. By this is meant not only compounds which ionize in the medium to produce free cyanide ions, but also certain complexes containing the cyanide group in a form which appears to be acted upon by the organism to liberate cyanide ion. Thus, for example, ionizable cyanides such as hydrogen cyanide, ammonium cyanide, alkali metal cyanides and alkaline earth metal cyanides can readily be employed in our process, but in addition it has been found that certain complexes such as alkali metal ferrocyanides and ferricyanides effect a similar precursor action apparently due to liberation of cyanide ion by the microorganism.

The amount of the substance furnishing a source of cyanide ion which is required to stimulate production of vitamin $B_{12}$ and vitamin $B_{12}$-like materials is extremely small, as little as 0.1 p. p. m. of cyanide ion showing a significant increase. Larger amounts of the substance furnishing cyanide ion can be employed, including amounts sufficient to furnish about 50–100 p. p. m. of cyanide ion. Further increases should generally be avoided, however, since free cyanide ion in excess of about 100 p. p. m. appears to have a toxic effect on the various vitamin $B_{12}$-producing organisms, resulting in a retarding of the growth during fermentation and falling off of the vitamin $B_{12}$ production. Complexes such as alkali metal ferrocyanides and ferricyanides do not furnish free cyanide ion in solution, and can be employed in larger amounts without danger of retarding growth during fermentation. For best results, it would appear that the substance furnishing a source of cyanide ion should be present in the fermentation medium in an amount to make available to the organism about 1–10 p. p. m. of cyanide ion.

The substance furnishing a source of cyanide ion is preferably incorporated in the medium at the start of the fermentation, the entire amount being added before fermentation is started, or separate portions of the total amount being added at the start of the fermentation and at intervals as the fermentation progresses. While an increased yield of vitamin $B_{12}$ and vitamin $B_{12}$-like materials is also obtained when a substance furnishing a source of cyanide ions is added after fermentation has been in progress for a period of time, it is generally found that in such instances the amount of increase is not as great as when cyanide ion is present from the start of the fermentation.

The following examples show how improved fermentation procedures in accordance with the present invention can be carried out, but it is to be understood that these examples are given by way of illustration and not of limitation.

*Example 1*

In 250 ml. Erlenmeyer flasks were placed 40 ml. quantities of a medium containing 1% of an enzymatic digest of casein, 0.3% beef extract, 0.5% sodium chloride, 10 p. p. m. cobalt nitrate hexahydrate and distilled water, at pH 7.0. To the flasks were added either 0, 0.1, 1, 10, 100, 1000 or 5000 p. p. m. of cyanide ion supplied as potassium cyanide. The media were then sterilized by autoclaving at 121° C. for 15 minutes.

To each flask was then added 1 ml. of a 40 hour vegetative culture of a grisein-producing strain of *S. griseus*, grown in a medium containing the same ingredients as those described above. The flasks were then plugged with cotton, placed on a 1½" amplitude shaker, and shaken for 65 hours at 28° C. Samples were taken from the flasks, examined for growth, tested for pH, and assayed against *L. lactis* Dorner. The following results were obtained:

| p. p. m. CN⁻ | Growth | pH | Average Activity LLD, u./ml. |
|---|---|---|---|
| 5,000 | – | 7.0 | |
| 1,000 | – | 7.0 | |
| 100 | + | 7.9 | <1,500 |
| 10 | + | 8.6 | 6,000 |
| 1 | + | 8.6 | 5,750 |
| 0.1 | + | 8.6 | 6,000 |
| 0 (control) | + | 8.5 | 4,950 |

Quantitative evaluations of vitamin $B_{12}$ and of vitamin $B_{12}$-like materials, measured as vitamin $B_{12a}$ were made by paper strip chromatographic technique. A control culture and a culture containing 1 p. p. m. of cyanide ion were evaluated as follows:

Cultures were acidified to pH 2.5, filtered, and neutralized. Ten ml. of filtrate was saturated with cresol and extracted with 2.5 ml. of carbon tetrachloride-cresol (3-1) (this extraction procedure is fully disclosed and claimed in an application of Denkewalter, Malcolmson and Hughey, Serial No. 179,888, filed August 16, 1950). Paper strips impregnated with $KH_2PO_4$ were spotted with 0.1 ml. quantities of extract and developed three days with water-saturated n-butanol. (By this technique, it has been found that pure vitamin $B_{12a}$ and vitamin $B_{12}$ localize in spots at about 2 inches and 7 inches respectively from the origin.) The vitamin-containing areas are identified by laying one of the developed strips on a large *L. lactis* Dorner assay plate. Having located the vitamin $B_{12}$ and vitamin $B_{12a}$ zones on the test strip, the active areas are then leached from duplicate strips with water and the leachings assayed quantitatively for vitamin content by the *L. lactis* Dorner titrimetric method (as outlined in J. Biol. Chem., 180, 125 (1949)). The following results were obtained:

| Culture | Millimicrograms of vitamin per ml. of culture | |
|---|---|---|
| | $B_{12}$ zone [1] | $B_{12a}$ zone [2] |
| Control | 8.5 | 90 |
| 1 p. p. m. CN− added | 36 | 178 |

[1] Compared with vitamin $B_{12}$ standard.
[2] Compared with vitamin $B_{12a}$ standard.

The increase in vitamin $B_{12}$ over the control was approximately fourfold, and the increase in substances resembling vitamin $B_{12a}$ was about twofold.

Example 2

In 5 l. glass fermentors were placed 3.2 l. quantities of the medium described in Example 1, and the fermentors and medium were sterilized by autoclaving at 121° C. for 45 minutes. The fermentors were inoculated with a vegetative culture of a streptomycin-producing strain of *S. griseus*, grown in a medium containing the same ingredients as those described in Example 1. Three groups of fermentors were treated with potassium cyanide, as follows: (1) 1 p. p. m. CN− added after autoclaving, (2) 5 p. p. m. CN− added after 48 hours of fermentation, and (3) 1 p. p. m. CN− added at 0, 24, 48, 72, and 96 hours. The fermentor contents were aerated and agitated for 110 hours at 27° C.

Chemical assays for vitamin $B_{12}$ and vitamin $B_{12}$-like materials were run on the entire contents of the fermentors at the end of the fermentation period. Assay steps were as follows: adsorption on activated charcoal, elution with butanol-water, extraction into benzyl alcohol, adsorption on alumina, and elution with methanol (the last three steps are disclosed and claimed in an application of Briggs et al., Serial No. 132,804, filed December 13, 1949). The vitamin $B_{12}$ and vitamin $B_{12}$-like materials were quantitatively estimated in the methanol eluate by comparison of light adsorption at 5500 Å (a characteristic maximum of vitamin $B_{12}$) with that of pure vitamin $B_{12}$. The results of the assays, calculated assuming that all of the color was due to vitamin $B_{12}$, were as follows:

| Culture | Total Color Calculated as Vitamin $B_{12}$, mg./1,000 gals. |
|---|---|
| Control | 128 |
| 1 p. p. m. CN− added at 0 hrs | 205 |
| 5 p. p. m. CN− added at 48 hrs | 190 |
| 1 p. p. m. CN− added at 0, 24, 48, 72, and 96 hrs | 207 |

A significant increase in yield was obtained with all methods of supplementation with potassium cyanide.

Example 3

In each of two 150 gal. stainless steel fermentors were placed 127 gals. of a medium containing 1% of an enzymatic digest of casein, 0.3% meat extract, 0.5% sodium chloride, 0.3% soybean oil, 10 p. p. m. cobalt nitrate hexahydrate, and tap water. The media were then sterilized by heating at 120° C. for 30 minutes. To one fermentor was added potassium cyanide sufficient to provide 1 p. p. m. of cyanide ion. The fermentors were then inoculated with a vegetative culture of a grisein-producing strain of *S. griseus*, grown in a medium containing the same ingredients as those described above, except that no soybean oil was present. The fermentor contents were aerated and agitated for 132 hours at 27° C.

Chemical assays for vitamin $B_{12}$ and vitamin $B_{12}$-like materials were run on the contents of the fermentors at the end of the fermentation period as described in Example 2. The results of the assays were as follows:

| Culture | Total Color Calculated as Vitamin $B_{12}$ mg./1,000 gals. |
|---|---|
| Control | 415 |
| 1 p. p. m. CN− added | 730 |

A significant increase in yield was obtained with potassium cyanide supplementation.

Example 4

A medium containing 1% of an enzymatic digest of casein, 0.3% beef extract, 0.5% NaCl, and 10 p. p. m. $Co(NO_3)_2 \cdot 6H_2O$ was prepared, distributed in 50 cc. quantities in 250 cc. flasks, 0.5% soybean oil added, and then sterilized by autoclaving at 121° C. for 15 minutes.

Potassium cyanide and calcium cyanide solutions in water were sterilized by filtration through an ultra-fine sintered glass filter and potassium ferricyanide and potassium ferrocyanide solutions were sterilized by autoclaving. The sterile solutions were added aseptically to the flasks of sterile culture medium in sufficient quantity to supply one microgram cyanide ion per ml. of medium in the case of the potassium and calcium salts, and one microgram per ml. of total —CN in the case of the complexes. To another flask potassium ferricyanide was added in an amount sufficient to supply 10 micrograms per ml. of total —CN.

All media, including a control medium to which no cyanide salt was added, were inoculated with one ml. of a vegetative culture of a streptomycin producing strain of *S. griseus*.

A second set of media was prepared containing 10 micrograms per ml. of —CN added as potassium ferricyanide, together with a control containing no added —CN. This set was inoculated with a vegetative culture of a neomycin producing strain of *S. fradiae*.

All flasks were incubated at 28° C. on a rotary shaker. After 4 days incubation, cultures were autoclaved at 121° C. for 15 minutes to release LLD active substances from the insolubles. Paper strips impregnated with $KH_2PO_4$ were spotted with measured quantities of the supernatant culture liquor and chromatographs developed with water-saturated n-butanol in an atmosphere saturated with these solvents at room temperature for 3 days. The active zone characteristic of vitamin $B_{12}$, which separated out on the chromatograph, was located microbiologically and leached with water. A quantitative microbiological assay was run to determine the quantity of vitamin $B_{12}$ contained in the culture broths. Results are as follows:

| Culture | Medium Supplement | Vitamin $B_{12}$ content of culture (millimicrograms per ml.) |
|---|---|---|
| S. griseus | none | 12 |
| Do | 1γ/ml. CN- as KCN | 110 |
| Do | 1γ/ml. CN- as Ca(CN)$_2$ | 17 |
| Do | 1γ/ml. CN- as K$_4$Fe(CN)$_6$ | 23 |
| Do | 1γ/ml. CN- as K$_3$Fe(CN)$_6$ | 51 |
| Do | 10γ/ml. CN- as K$_3$Fe(CN)$_6$ | 96 |
| S. fradiae | none | 43 |
| Do | 10γ/ml. CN as K$_3$Fe(CN)$_6$ | 64 |

Example 5

In 250 ml. Erlenmeyer flasks were placed 50 ml. quantities of a medium containing 2% of an enzymatic digest of casein 0.5% beef extract, 0.25% $K_2HPO_4$ and 10 p. p. m. cobalt nitrate hexahydrate. All flasks were sterilized by autoclaving at 120° C. for 20 minutes. A water solution of KCN was sterilized by filtration through an ultra-fine sintered glass filter and added to each flask aseptically as indicated. All flasks were inoculated with 1 ml. of a 24 hr. submerged culture of an isolate from cow rumen contents identified as an *Alkaligenes faecalis*, grown in a medium containing the same ingredients as those described above. The cultures were incubated at 28° C. on a 1½" amplitude shaker for three days. The harvested cultures were autoclaved 15 minutes at 120° C. to liberate the total LLD active substances, and assayed for LLD activity by the cup assay procedure with *L. lactis* Dorner as a test organism and vitamin $B_{12}$ as a standard. Samples were centrifuged to remove cellular debris and 10 ml. of the supernatant extracted with 2.5 ml. of cresol-carbon tetrachloride, as described in Example 1. The solvent layer was separated and 0.04 ml. spotted on a paper strip impregnated with $KH_2PO_4$ and developed 3 days with water-saturated n-butanol. The LLD active area characteristic of vitamin $B_{12}$ was located and leached with water for quantitative assay. *Alkaligenes faecalis* is characterizde by production of a large amount of LLD active substances which do not appear to be chemically similar to vitamin $B_{12}$. In the presence of potassium cyanide, vitamin $B_{12}$ was produced, as shown by paper strip chromatography.

| Amount of KCN added | | *L. lactis* assay, units per ml. culture | |
|---|---|---|---|
| Before inoculation, p. p. m. | After 24 hours, incubation, p. p. m. | LLD activity of culture | LLD units leached from paper strip $B_{12}$ zone |
| 0 | 0 | 4,800 | <650 |
| 8 | 0 | 12,400 | 875 |
| 8 | 8 | 32,400 | 1,800 |

Vitamin $B_{12}$ contains 11,000 LLD units per microgram. Therefore, in the above experiment, from cultures grown on medium supplemented with 8 p. p. m. KCN before inoculation, 0.079γ of vitamin $B_{12}$ per ml. of culture was separated, and from cultures having an additional 8 p. p. m. KCN added at the 24th hour of incubation, 0.164γ of vitamin $B_{12}$ per ml. of culture was separated.

Example 6

A medium containing 4% distillers dried solubles and 10 p. p. m. $Co(NO_3)_2.6H_2O$ in water was prepared and distributed in 40 cc. quantities in 250 cc. flasks. Sufficient potassium cyanide was added to the flasks to furnish 0.1, 1.0 and 10 p. p. m. of CN ion in the medium. Flasks were plugged with cotton and sterilized by autoclaving at 121° C. for 15 minutes.

Vegetative inoculum was prepared by culturing in a beef extract-enzymatic digest of casein type medium an unidentified microorganism belonging to the genus Streptomyces, isolated from a sample of decomposed barnyard litter. This culture was found to be an exceptionally good culture for production of vitamin $B_{12}$.

The media were inoculated with one ml. of the above vegetative inoculum and incubated for four days at 28° C. on a shaker.

At the completion of the fermentation, the total LLD activity of the culture was determined by *L. lactis* titrimetric assay. The vitamin $B_{12}$ and $B_{12}$-like material was extracted and quantitatively measured by the paper strip chromatographic technique described in Example 1. Results are recorded in the following table.

| Medium supplement | *L. lactis* assay, units per ml. of culture | |
|---|---|---|
| | LLD activity of culture | $B_{12}$ and $B_{12}$-like material units |
| none | 23,800 | 14,800 |
| 0.1 p. p. m. CN- | 27,600 | 17,000 |
| 1.0 p. p. m. CN- | 37,200 | 21,300 |
| 10 p. p. m. CN- | 30,500 | 27,000 |

Various changes and modifications in the foregoing procedure will occur to those versed in the art, and to the extent that such changes and modifications fall within the purview of the appended claims, it will be understood that they constitute part of our invention.

We claim:

1. In the production of vitamin $B_{12}$ and vitamin $B_{12}$-like materials by fermentation of a nutrient medium with a vitamin $B_{12}$ producing organism, the improvement which comprises conducting the fermentation in the presence of a substance furnishing a source of cyanide ion in an amount within the range of about 0.1 to 100 parts per million.

2. The process as defined in claim 1 wherein the fermentation is conducted in the presence of a substance furnishing a source of cyanide ion in an amount within the range of about 1 to 10 parts per million.

3. In the production of vitamin $B_{12}$ and vitamin $B_{12}$-like materials by fermentation of a nutrient medium with a vitamin $B_{12}$ producing organism, the improvement which comprises conducting the fermentation in the presence of an ionizable cyanide in an amount to provide a cyanide ion concentration within the range of about 0.1 to 100 parts per million.

4. The process as defined in claim 3 wherein the ionizable cyanide is an alkali metal cyanide.

5. The process as defined in claim 3 wherein the ionizable cyanide is potasisum cyanide.

6. The process as defined in claim 3 wherein the ionizable cyanide is present in an amount to provide a cyanide ion concentration within the range of about 1 to 10 parts per million.

7. In the production of vitamin $B_{12}$ and vitamin $B_{12}$-like materials by fermentation of a nutrient medium with a vitamin $B_{12}$ producing organism, the improvement which comprises conducting the fermentation in the presence of an alkali metal ferrocyanide furnishing a source of cyanide ion in an amount within the range of about 0.1 to 100 parts per million.

8. In the production of vitamin $B_{12}$ and vitamin $B_{12}$-like materials by fermentation of a nutrient medium with a vitamin $B_{12}$ producing organism, the improvement which comprises conducting the fermentation in the presence of an alkali metal ferricyanide furnishing a source of cyanide ion in an amount within the range of about 0.1 to 100 parts per million.

9. In the production of vitamin $B_{12}$ and vitamin $B_{12}$-like materials by fermentation of a nutrient medium with a vitamin $B_{12}$ producing organism, the improvement which comprises conducting the fermentation in the presence of a substance furnishing a source of cyanide ion in an amount within the range of about 0.1 to 100 parts per million, said substance being added to the medium at the start of fermentation.

10. In the production of vitamin $B_{12}$ and vitamin $B_{12}$-like materials by fermentation of a nutrient medium with a vitamin $B_{12}$ producing organism, the improvement which comprises conducting the fermentation in the presence of a substance furnishing a source of cyanide ion in an amount within the range of about 0.1 to 100 parts per million, said substance being added to the medium at the start of the fermentation and again at periodic intervals as the fermentation progresses.

LLOYD E. McDANIEL.
HAROLD B. WOODRUFF.

References Cited in the file of this patent

UNITED STATES PATENTS

| Number | Name | Date |
|---|---|---|
| 1,763,112 | Wallerstein | June 10, 1930 |
| 2,530,416 | Wolf | Nov. 21, 1950 |

OTHER REFERENCES

Porter, Bacterial Chemistry and Physiology, 1946, John Wiley and Sons, Inc., New York, pages 255, 837, 838.

Rickes, Science 108, pages 634–635.

Hausmann, Lancet, November 19, 1949, pages 962, 963.

Foster, Chemical Activities of Fungi, 1949, Academic Press, New York, page 462.